US009098921B2

(12) United States Patent
Kurokawa et al.

(10) Patent No.: US 9,098,921 B2
(45) Date of Patent: Aug. 4, 2015

(54) IMAGE PROCESSOR AND IMAGE PROCESSING METHOD

(71) Applicant: Japan Display West Inc., Aichi-ken (JP)

(72) Inventors: Soichiro Kurokawa, Kanagawa (JP); Toshiyuki Nagatsuma, Kanagawa (JP); Tsutomu Harada, Kanagawa (JP)

(73) Assignee: Japan Display Inc., Tokyo (JP)

( * ) Notice: Subject to any disclaimer, the term of this patent is extended or adjusted under 35 U.S.C. 154(b) by 128 days.

(21) Appl. No.: 13/722,516

(22) Filed: Dec. 20, 2012

(65) Prior Publication Data

US 2013/0251285 A1  Sep. 26, 2013

(30) Foreign Application Priority Data

Mar. 21, 2012  (JP) .................................. 2012-063752

(51) Int. Cl.
*G06K 9/40* (2006.01)
*G06T 5/40* (2006.01)
(Continued)

(52) U.S. Cl.
CPC .. *G06T 5/40* (2013.01); *H04N 5/20* (2013.01); *H04N 5/202* (2013.01)

(58) Field of Classification Search
CPC .......... H04N 1/32203; H04N 1/32208; H04N 1/32229; H04N 1/32245; H04N 1/32251; H04N 1/32288; H04N 1/3232; H04N 19/00; H04N 19/00557; H04N 21/23892; H04N 21/8358; H04N 2201/3233; H04N 2201/3235; H04N 2201/327; G06F 21/64; G06T 1/005; G06T 1/10028; G06T 1/0064; G06T 2201/0051; G06T 2201/0052; G06T 2201/0061; G06T 2201/0065; G06T 2201/0601; G06T 2201/0081; G06Q 20/341; G06Q 20/40145; G07D 7/0033; G07D 7/008; G07D 7/12; G07D 7/20; G07D 7/2008; G07D 7/2033; G07C 9/00079; G10L 19/018; G11B 20/00086; G11B 20/00884; G07F 7/08; G07F 7/12; G07F 7/16; G07F 7/1008
See application file for complete search history.

(56) References Cited

U.S. PATENT DOCUMENTS 5,636,296 A * 6/1997 Kaneko et al. ................ 382/276
5,721,788 A * 2/1998 Powell et al. ................. 382/100
6,829,367 B1 * 12/2004 Toyokawa et al. ............ 382/100

FOREIGN PATENT DOCUMENTS

JP  06-233124  8/1994
JP  10-091119  4/1998
(Continued)

OTHER PUBLICATIONS

Japanese Office Action issued Feb. 5, 2015 for ctorresponding Japanese Application No. 2012-063752.
(Continued)

*Primary Examiner* — Jose Couso
(74) *Attorney, Agent, or Firm* — Fishman Stewart Yamaguchi PLLC (57) ABSTRACT

Disclosed herein is an image processor including: a random number sequence generation section adapted to generate a random number sequence; a random number-superimposed luminance variable generation section adapted to generate a random number-superimposed luminance variable by superimposing the random number sequence on a luminance variable; and a random number-superimposed image signal generation section adapted to generate a random number-superimposed image signal by superimposing the random number-superimposed luminance variable on an image signal.

8 Claims, 9 Drawing Sheets

(51) Int. Cl.
*H04N 5/20* (2006.01)
*H04N 5/202* (2006.01)

(56) References Cited

FOREIGN PATENT DOCUMENTS

| JP | 2001-337667 A | 12/2001 |
| JP | 2002-232713 | 8/2002 |
| JP | 2003-023541 | 1/2003 |
| JP | 2006-350009 A | 12/2006 |
| WO | WO-2010/055644 A1 | 5/2010 |

OTHER PUBLICATIONS

Japanese Office Action issued Feb. 3, 2014 for corresponding Japanese Application No. 2012-063752.

* cited by examiner

RANDOM NUMBER SEQUENCE
FOR nTH FRAME

| 1 | 4 | 0 | 2 | 5 |
|---|---|---|---|---|
| 3 | 2 | 7 | 0 | 1 |
| 2 | 4 | 7 | 2 | 3 |
| 5 | 6 | 6 | 1 | 0 |
| 0 | 2 | 6 | 1 | 3 |

RANDOM NUMBER SEQUENCE
FOR (n+1)TH FRAME

| 1 | 4 | 0 | 2 | 5 |
|---|---|---|---|---|
| 3 | 2 | 7 | 0 | 1 |
| 2 | 4 | 7 | 2 | 3 |
| 5 | 6 | 6 | 1 | 0 |
| 0 | 2 | 6 | 1 | 3 |

RANDOM NUMBER SEQUENCE
FOR (n+2)TH FRAME

| 1 | 4 | 0 | 2 | 5 |
|---|---|---|---|---|
| 3 | 2 | 7 | 0 | 1 |
| 2 | 4 | 7 | 2 | 3 |
| 5 | 6 | 6 | 1 | 0 |
| 0 | 2 | 6 | 1 | 3 |

FIG. 9

IMAGE PROCESSOR AND IMAGE PROCESSING METHOD

BACKGROUND

The present technology relates to an image processor adapted to process an image and an image processing method.

Recent years have seen the development of high-definition liquid crystal display panels applicable to digital cameras and other products. In such a liquid crystal display panel, the RGBW scheme is used in which a W (white) subpixel is added to the ordinary R (red), G (green) and B (blue) subpixels in each pixel.

By enhancing white through the addition of adding a white subpixel to each pixel, it is possible to maintain the brightness comparable to that of an RGB liquid crystal panel in related art even if the power consumption of the backlight is reduced 50 percent. Further, it is possible to improve the luminance about two-fold as compared to liquid crystal display panels in related art, thus minimizing the power consumption of the backlight and providing improved visibility outdoors.

As one of the image quality improvement techniques in related art, a technique has been proposed to improve the image quality degradation by calculating, based on a random number, the weight of error of a plurality of pixels near the pixel of interest and superimposing the mean weight of error of the pixels near the pixel of interest on the corrected image signal (Japanese Patent Laid-Open No. 2002-232713). Another technique has been also proposed to render less noticeable false contour appearing at the boundary between the area on which noise is superimposed and that on which noise is not superimposed by superimposing noise on the pixels according to the input density of image data (Japanese Patent Laid-Open No. 2003-023541).

SUMMARY

Video equipment having the above high-definition liquid crystal panel analyzes the input signal image and produces video output commensurate with the image analysis result. For example, if a signal of a 16-bit gray level image whose grayscale ranges from 0 to 65536 is input, the high-definition liquid crystal panel having 8-bit gray level representation capability displays the image signal with 256 gray levels from 0 to 255 according to the image analysis result.

However, because the gray levels of the initial input signal from 0 to 65536 have been converted to those from 0 to 255, errors occur due to steplike increase and decrease in gray level, thus causing image degradation attributable to such errors to be visible from time to time.

In light of the foregoing, it is desirable to provide an image processor and image processing method for improving the image quality degradation attributable to errors caused by steplike increase and decrease in gray level.

According to an embodiment of the present technology, there is provided an image processor. The processor includes a random number sequence generation section, random number-superimposed luminance variable generation section and random number-superimposed image signal generation section. The random number sequence generation section generates a random number sequence. The random number-superimposed luminance variable generation section generates a random number-superimposed luminance variable by superimposing the random number sequence on a luminance variable. The random number-superimposed image signal generation section generates a random number-superimposed image signal by superimposing the random number-superimposed luminance variable on an image signal.

It is possible to improve the image quality degradation attributable to errors caused by steplike increase and decrease in gray level.

BRIEF DESCRIPTION OF THE DRAWINGS

FIG. 9 is a diagram for describing the process adapted to minimize screen burn-in.

DETAILED DESCRIPTION OF THE PREFERRED EMBODIMENT

Figure 1:
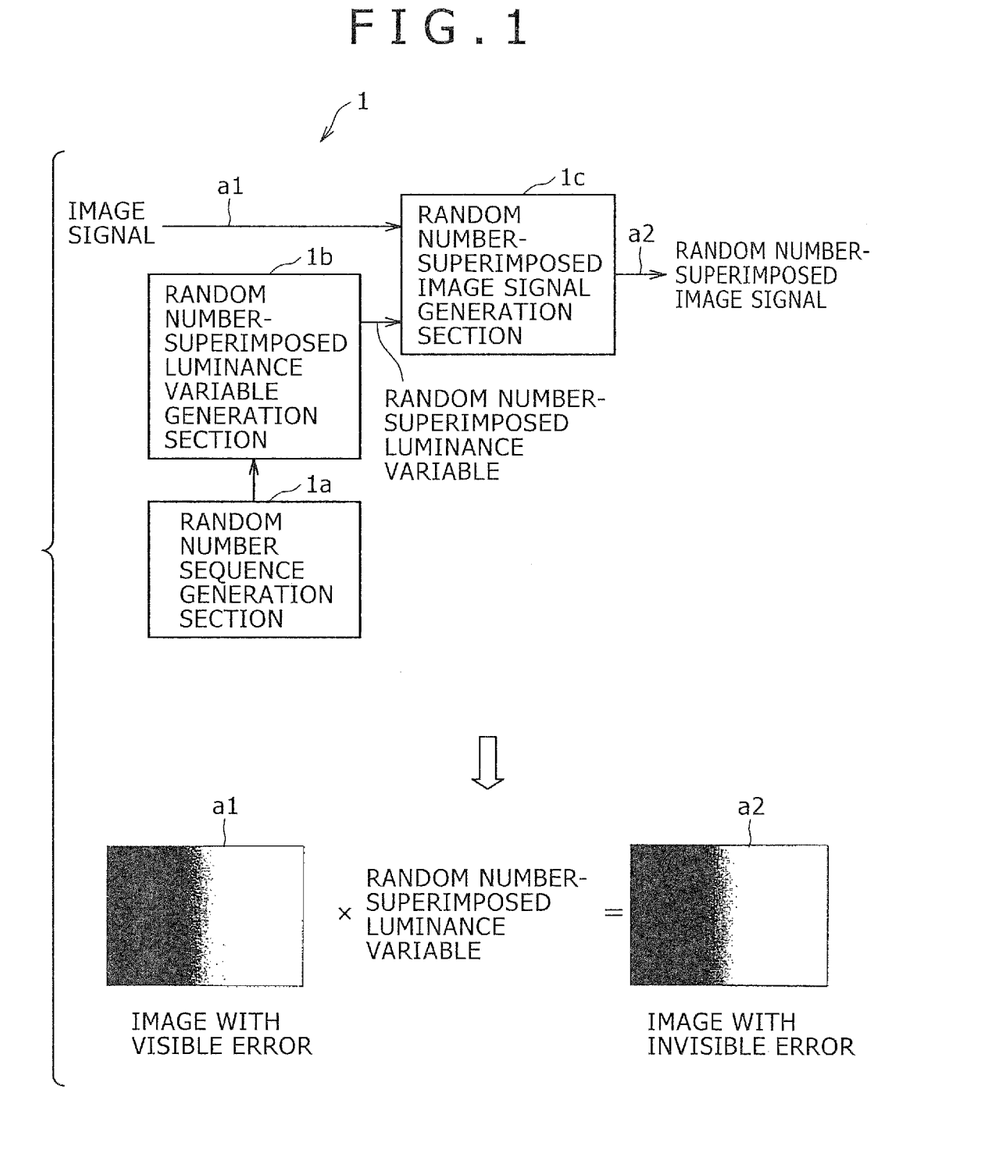
FIG. 1 is a diagram illustrating a configuration example of an image processor.

A description will be given below of the preferred embodiment with reference to the accompanying drawings. FIG. 1 is a diagram illustrating a configuration example of an image processor. An image processor 1 includes a random number sequence generation section 1a, random number-superimposed luminance variable generation section 1b and random number-superimposed image signal generation section 1c.

The random number sequence generation section 1a generates a random number sequence. The random number-superimposed luminance variable generation section 1b generates a random number-superimposed luminance variable by superimposing the random number sequence on a luminance variable. The random number-superimposed image signal generation section 1c generates a random number-superimposed image signal a2 by superimposing the random number-superimposed luminance variable on an image signal a1.

Here, the image signal a1 is an image in which errors caused by steplike increase and decrease in gray level (vertical streaks in FIG. 1) are visible. It is possible to generate the error-free random number-superimposed image signal a2 with improved image quality with invisible error by superimposing a random number-superimposed luminance variable on the image signal.

It should be noted that the luminance variable is a parameter indicating how many fold the output luminance is greater than the luminance of the original image signal. Three primary colors of RGB and RGBW with an addition of white are among color information of a pixel. In order to represent the luminance (brightness) of a pixel, the luminance variable is further added to represent a pixel with these pieces of information. It should be noted that the luminance variable is also referred to as a stretch factor or α value. The luminance variable will be hereinafter referred to as a stretch factor in the description given below.

A description will be given next of the main problem to be solved by the present technology. In the image operation process, a calculation error in an image having a smooth change in luminance leads to false contour.

For example, an image operation adapted to convert a 16-bit gray level image signal into an 8-bit gray level image signal as described above leads to false contour due to errors caused by steplike increase and decrease in gray level.

On the other hand, even if the false contour is low in magnitude to the extent of becoming invisible, in the case of the stretch factor varies in straight line manner, the position of the false contour moves with variation in the stretch factor (hereinafter referred to as waving), thus resulting in image degradation.

The image processor 1 according to the present technology superimposes a random number in each pixel calculation step, thus performing gradation smoothing so as to distribute the probability of error (error distribution) and rendering false contour and waving invisible for improved image quality.

Figure 2:
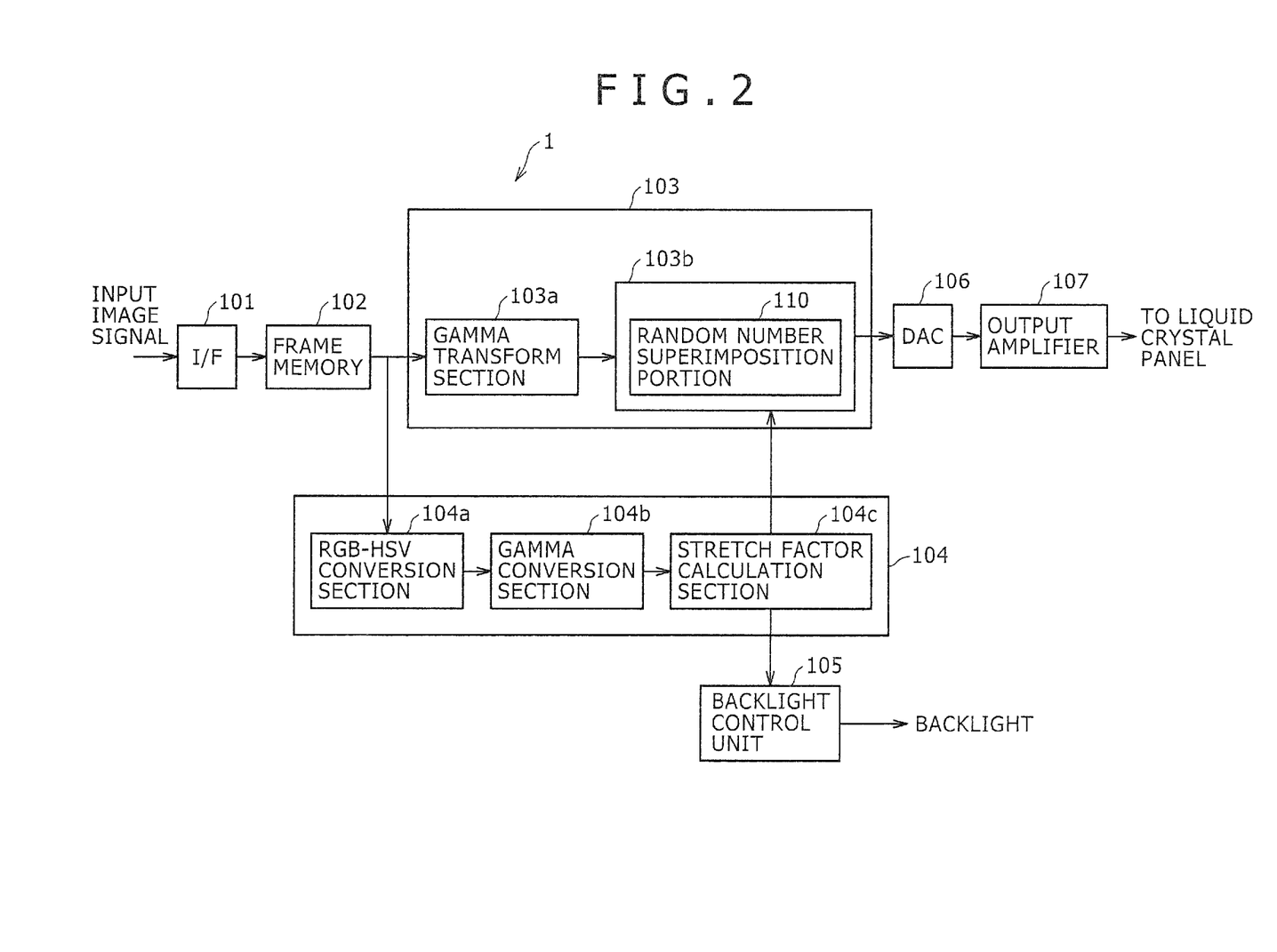
FIG. 2 is a diagram illustrating an example of overall configuration the image processor.

A description will be given below of the overall configuration of the image processor 1. FIG. 2 is a diagram illustrating an example of overall configuration of the image processor. The image control system of the same processor 1 includes an image input I/F (interface) section 101, frame memory 102, data conversion unit 103, stretch factor generation unit 104, backlight control unit 105, D/A (digital to analog) converter 106 and output amplifier 107.

The image input I/F section 101 receives an input image signal to serve as a reception interface. The frame memory 102 stores the input image signal in units of a frame (for an audiovisual system, the frame memory 102 is not necessary).

An RGB signal (24-bit), i.e., an image signal read from the frame memory 102, is transmitted to the data conversion unit 103 and stretch factor generation unit 104.

The data conversion unit 103 includes a gamma transform section 103a and image operation section 103b. The gamma transform section 103a transforms the luminance (brightness) component of the input image signal into a luminance value (chromogenic property) of the liquid crystal panel of the display.

Figure 3:
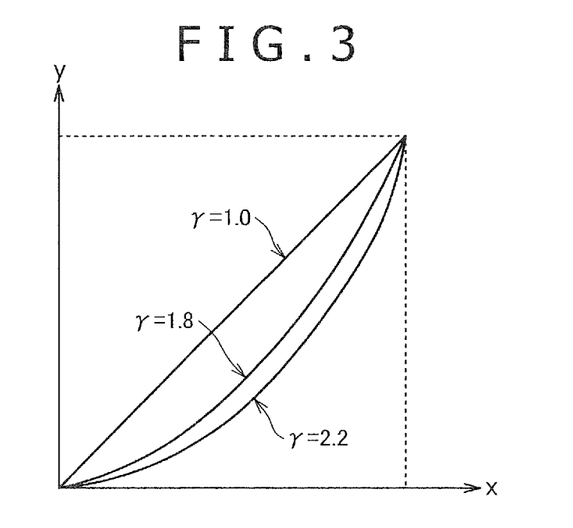
FIG. 3 is a diagram illustrating a gamma characteristic.

FIG. 3 is a diagram illustrating a gamma characteristic. The horizontal axis represents the luminance level of the input image, and the vertical axis the luminance level of the output image. A display should ideally have a y=x relationship with a gamma value of 1.0. However, a display does not generally have a y=x relationship because of its intrinsic gamma characteristic (gamma value). In Windows (registered trademark) standards, for example, the gamma value is adjusted to 2.2.

Normally, the gamma characteristic of a display is such that the halftone tends to be dark. Therefore, a signal with a brighter halftone is input in advance to bring the input-output balance closer to a 1:1 ratio, thus making it possible to reproduce color information accurately. An arrangement adapted to adjust color information to match the gamma characteristic of the display as described above is referred to as gamma transform (gamma correction).

Referring back to FIG. 2, the image operation section 103b includes a random number superimposition portion 110 which will be described later. The same section 103b receives the stretch factor from the stretch factor generation unit 104 and performs image operations, thus outputting an image signal (RGB signal (24-bit)) produced by the image operations.

The D/A converter 106 converts the digital image signal from the image operation section 103b into an analog image signal. The output amplifier 107 amplifies the level of the analog image signal and outputs the amplified image signal to the liquid crystal panel at the subsequent stage.

The stretch factor generation unit 104 includes an RGB-HSV conversion section 104a, gamma transform section 104b and stretch factor calculation section 104c. The RGB-HSV conversion section 104a converts the RGB signal of the input image into an HSV space signal.

It should be noted that the H stands for hue, the S for saturation or chroma, and the V for brightness, lightness or value. The HSV space is a color space made up of these three components.

The gamma transform section 104b performs gamma transform of the HSV space image signal. The stretch factor calculation section 104c calculates a stretch factor from the gamma-corrected HSV space image signal. The stretch factor serves as a parameter adapted to control the image signal level according to the excess or insufficiency of the light emission in such a manner that the image signal level is increased (amplitude is stretched) when the light emission is insufficient and reduced (amplitude is reduced) when the light emission is excessive.

The backlight control unit 105 lights up the backlight by controlling the luminance thereof using a PWM (pulse width modulation) signal according to the stretch factor.

Figure 4:
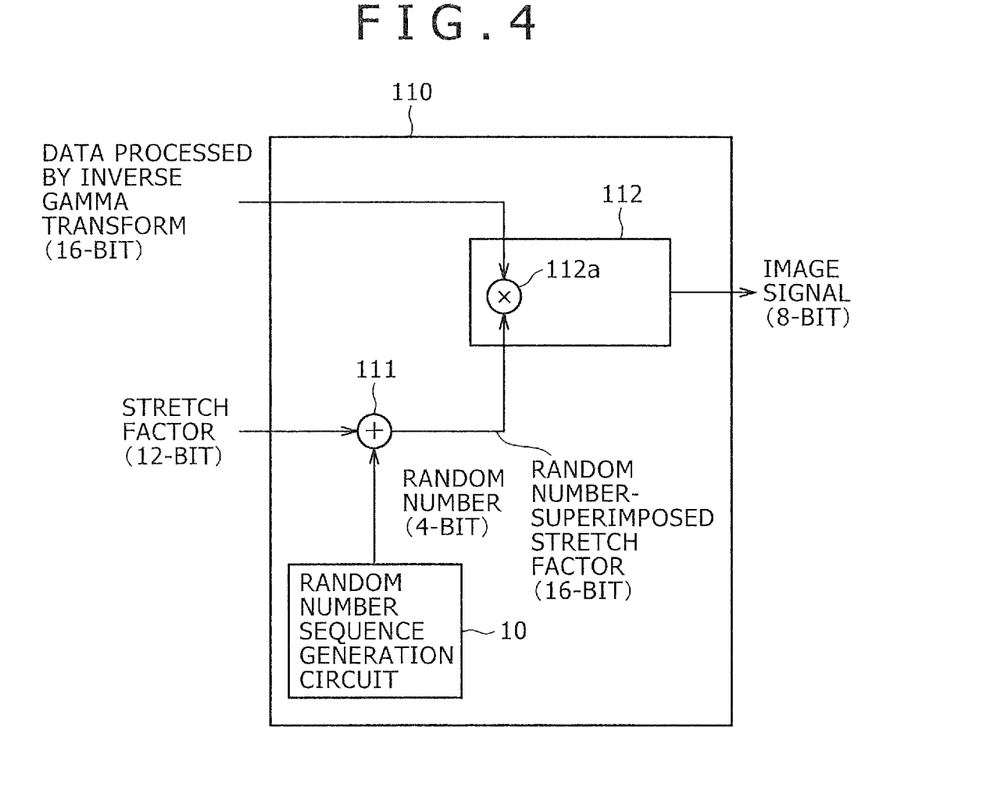
FIG. 4 is a diagram illustrating a configuration example of a random number superimposition portion.

A description will be given next of the random number superimposition portion 110 included in the image operation section 103b. FIG. 4 is a diagram illustrating a configuration example of the random number superimposition portion. The same portion 110 includes an adder 111 and image output part 112. It should be noted that the image output part 112 includes a multiplier 112a.

Here, a random number sequence generation circuit 10 includes the capability of the random number sequence generation section 1a shown in FIG. 1, and the adder 111 the capability of the random number-superimposed luminance variable generation section 1b. Further, the image output part 112 includes the capability of the random number-superimposed image signal generation section 1c.

Figure 6:
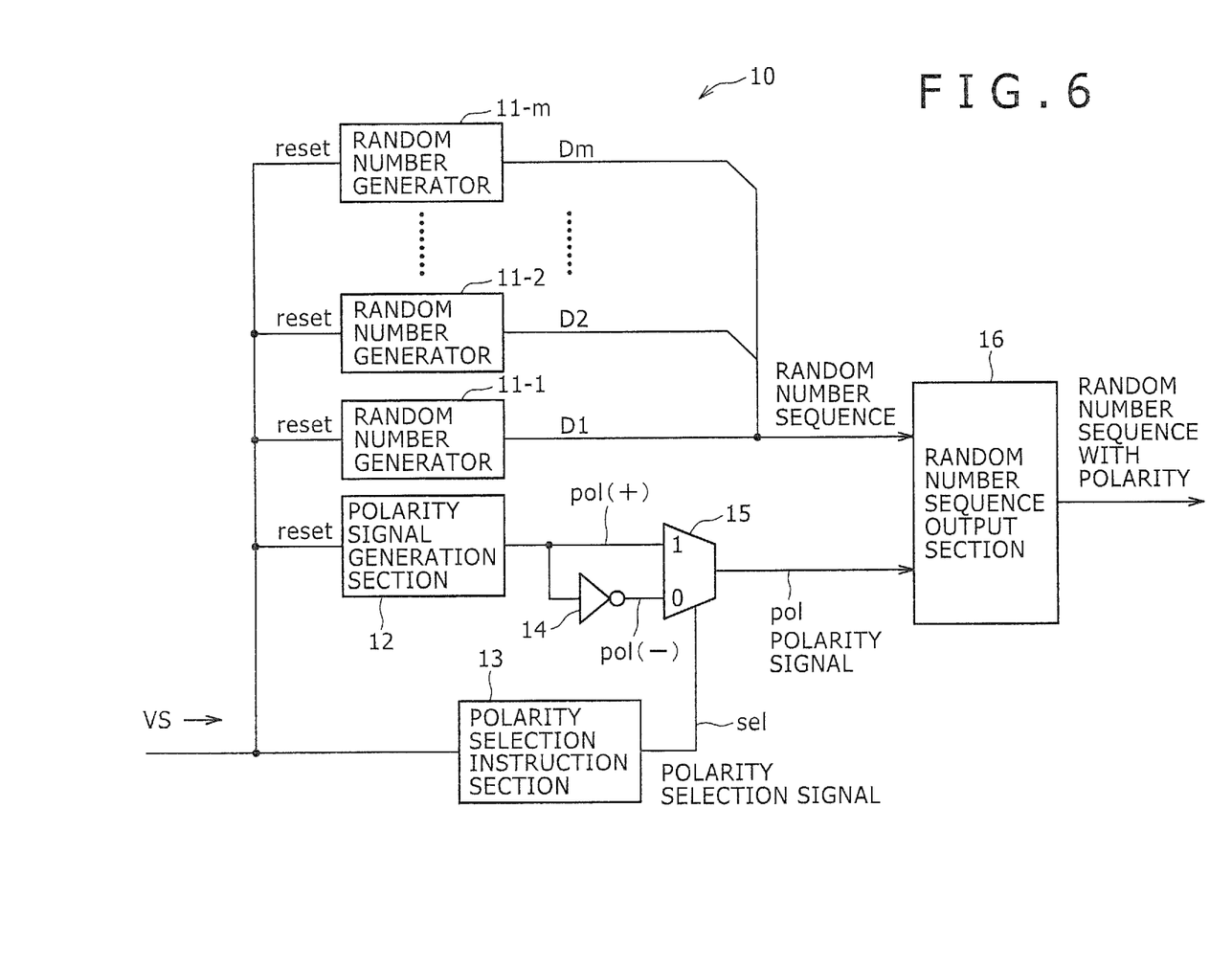
FIG. 6 is a diagram illustrating a configuration example of a random number sequence generation circuit.

The random number sequence generation circuit 10 generates and outputs a random number sequence (the configuration and operation of the same circuit 10 will be described later with reference to FIG. 6 and subsequent figures). The adder 111 adds the stretch factor (12-bit) and the random number (4-bit) together, thus generating a random number-superimposed stretch factor (16-bit).

The multiplier 112a in the image output part 112 multiplies the data obtained by inverse gamma transform of the image signal by the random number-superimposed stretch factor (16-bit), thus generating a random number-superimposed image signal.

Further, the image output part 112 rounds the random number-superimposed image signal from the multiplier 112a to an image signal (8-bit).

Figure 5:
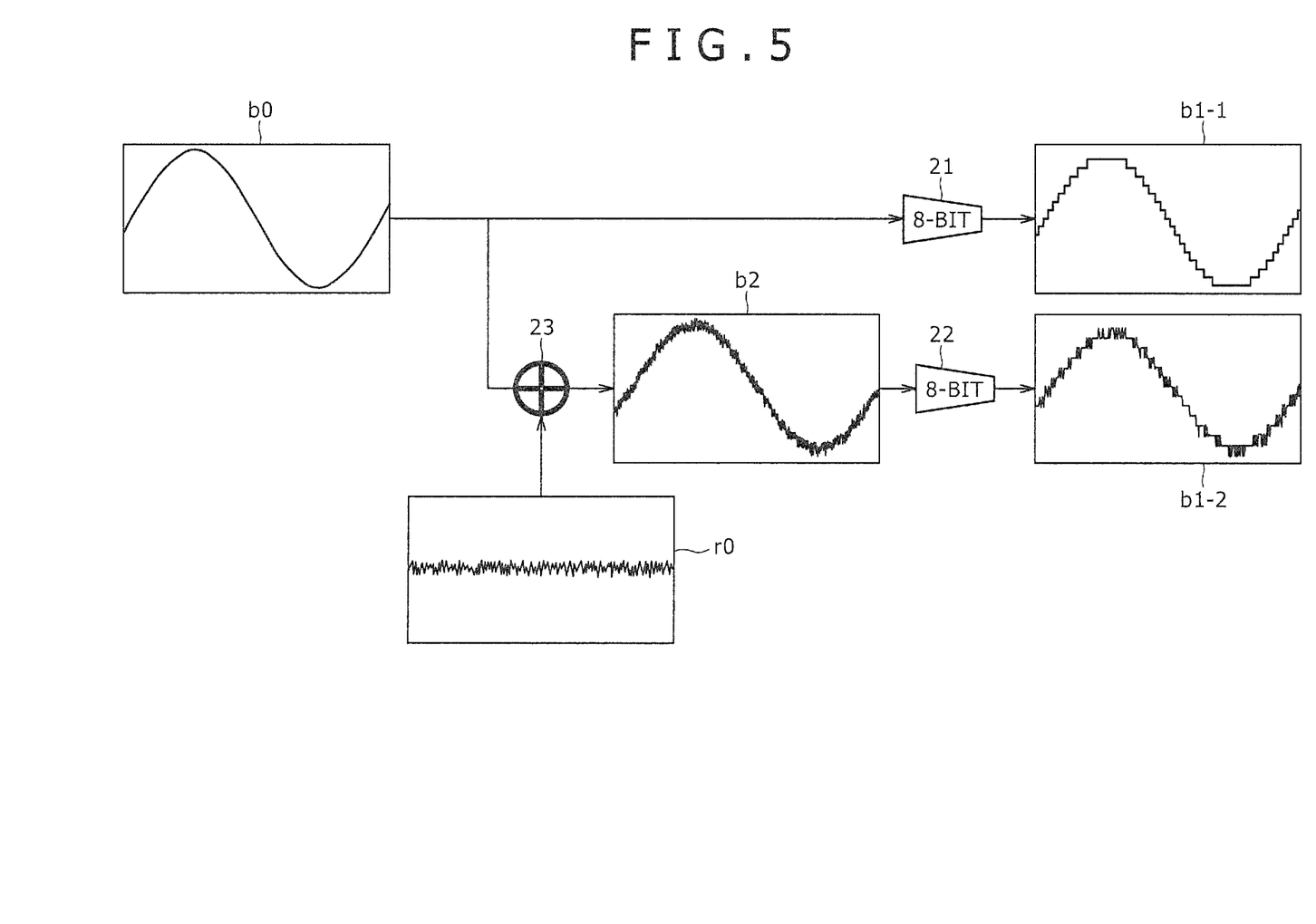
FIG. 5 is a diagram for describing the concept of random number superimposition.

A description will be given here of the operating principle adapted to minimize image quality degradation due to errors caused by steplike increase and decrease in gray level. FIG. 5 is a diagram for describing the concept of random number superimposition. We consider a case in which a 16-bit gray level input image signal is transformed into an 8-bit gray level image signal.

A decoder 21 decodes 16-bit gray level image signal b0 into an 8-bit image signal b1-1, thus outputting the image signal b1-1. Steplike increase and decrease in gray level are obvious in the image signal b1-1, thus resulting in image quality degradation.

In contrast, the random number superimposition adds a random number r0 to the 16-bit gray level image signal b0 first using the adder 23 to generate a random number-superimposed image signal b2, followed by decoding of the same signal b2 into an 8-bit gray level image signal b1-2, after which the same signal b1-2 is output by the decoder 22.

The random number r0 has been superimposed on the image signal b1-2 in the gray level conversion process, thus distributing the errors caused by steplike increase and decrease in gray level (dithering) and making a single increase or decrease in gray level less visible.

As described above, superimposing a random number (a kind of noise-like data) onto an image signal using dithering technique distributes the errors resulting from the gray level conversion, thus resolving false contour and waving, a phenomenon in which steplike increase and decrease in gray level are seen in the form of waving, and improving the image quality degradation attributable to errors caused by steplike increase and decrease in gray level.

It should be noted that a random number itself is superimposed on the image signal in FIG. 5. Therefore, it is necessary to superimpose the random number on each of RGB, thus resulting in a larger scale of operation and a larger scale circuit.

In contrast, the present technology superimposes a random number sequence on a stretch factor and a random number sequence-superimposed stretch factor on an image signal. This provides the same advantageous effect as for the above using a smaller scale of operation and a smaller scale circuit.

A description will be given next of the configuration of the random number sequence generation circuit 10. FIG. 6 is a diagram illustrating a configuration example of a random number sequence generation circuit. The same circuit 10 includes random number generators 11-1 to 11-$m$, polarity signal generation section 12, polarity selection instruction section 13, inverter 14, selector 15 and random number sequence output section 16.

The random number generators 11-1 to 11-$m$ perform a random number generation process, thus generating random numbers D1 to Dm respectively. On the other hand, the random number generation process is reset by a vertical synchronization signal vs (vsync).

The polarity signal generation section 12 outputs a polarity signal pol(+). The polarity signal generation process of the same section 12 is reset by the vertical synchronization signal vs. The polarity selection instruction section 13 outputs a polarity selection signal sel.

It should be noted that the polarity selection instruction section 13 inverts the level of the polarity selection signal sel based on the vertical synchronization signal vs, thus outputting the resultant signal. Although described in detail later with reference to FIG. 9, the level of the polarity selection signal sel is inverted once every two frames based on the vertical synchronization signal vs.

The inverter 14 inverts the polarity signal pol(+) and outputs a polarity signal pol(−). The selector 15 selects, based on the polarity selection signal sel, either the polarity signal pol(+) or polarity signal pol(−) and outputs the selected signal.

The random number sequence output section 16 generates a random number sequence by adding the polarity signal pol output from the selector 15 to the random number sequence output from the random number generators 11-1 to 11-$m$, thus outputting the generated random number sequence.

Here, a set of 1s and 0s generated by the random number sequence generation circuit 10 is a steady-state pattern. Therefore, a generated random number can be considered a pseudo-random number.

More specifically, when the random number generators 11-1 to 11-$m$ are reset by the vertical synchronization signal vs, an initial value is given by the internal circuit. The random number generators 11-1 to 11-$m$ generate and output random numbers by the same rule based on the initial value.

Therefore, if a certain initial value is given, the random number sequence (set of 1s and 0s) generated based on the initial value is uniquely determined.

Here, it has been verified that superimposing a random number sequence on a stretch factor and superimposing the random number sequence-superimposed stretch factor on an image signal renders false contour and waving invisible as described above. However, superimposing a random number sequence on a stretch factor every frame has transformed, in some cases, a random number into flickering depending on the image, thus rendering flickering visible on the image.

Figure 7:
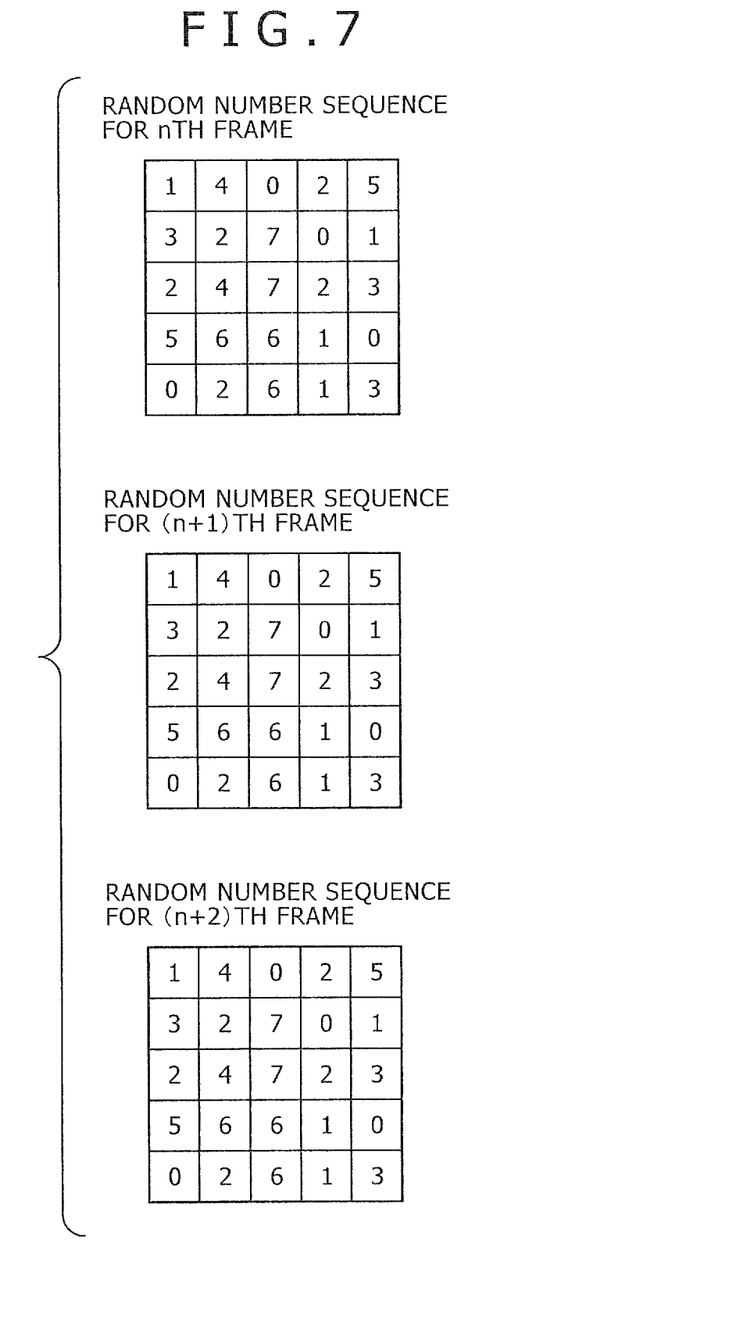
FIG. 7 is a diagram for describing the process adapted to minimize flickering.

A description will be given next of the process adapted to minimize flickering. FIG. 7 is a diagram for describing the process adapted to minimize flickering. A fixed random number sequence was used across all frames to minimize flickering.

More specifically, the plurality of random number generators are reset in synchronism with the vertical synchronization signal vs, thus generating random numbers having the same set.

In the case of FIG. 7, the random number sequences for the nth, n+1th and n+2th frames all have the same set of numbers.

As described above, it has been verified that flickering is minimized to the extent of becoming invisible by outputting the same random number sequence every frame. Further, it has been found as a result of the process illustrated in FIG. 7 that false contour and waving are also minimized to the extent of becoming invisible.

However, it has been discovered as a result of using a fixed sequence number across all frames as illustrated in FIG. 7 that the random number may be visible as FPN (fitted pattern noise) on the image.

Figure 8:
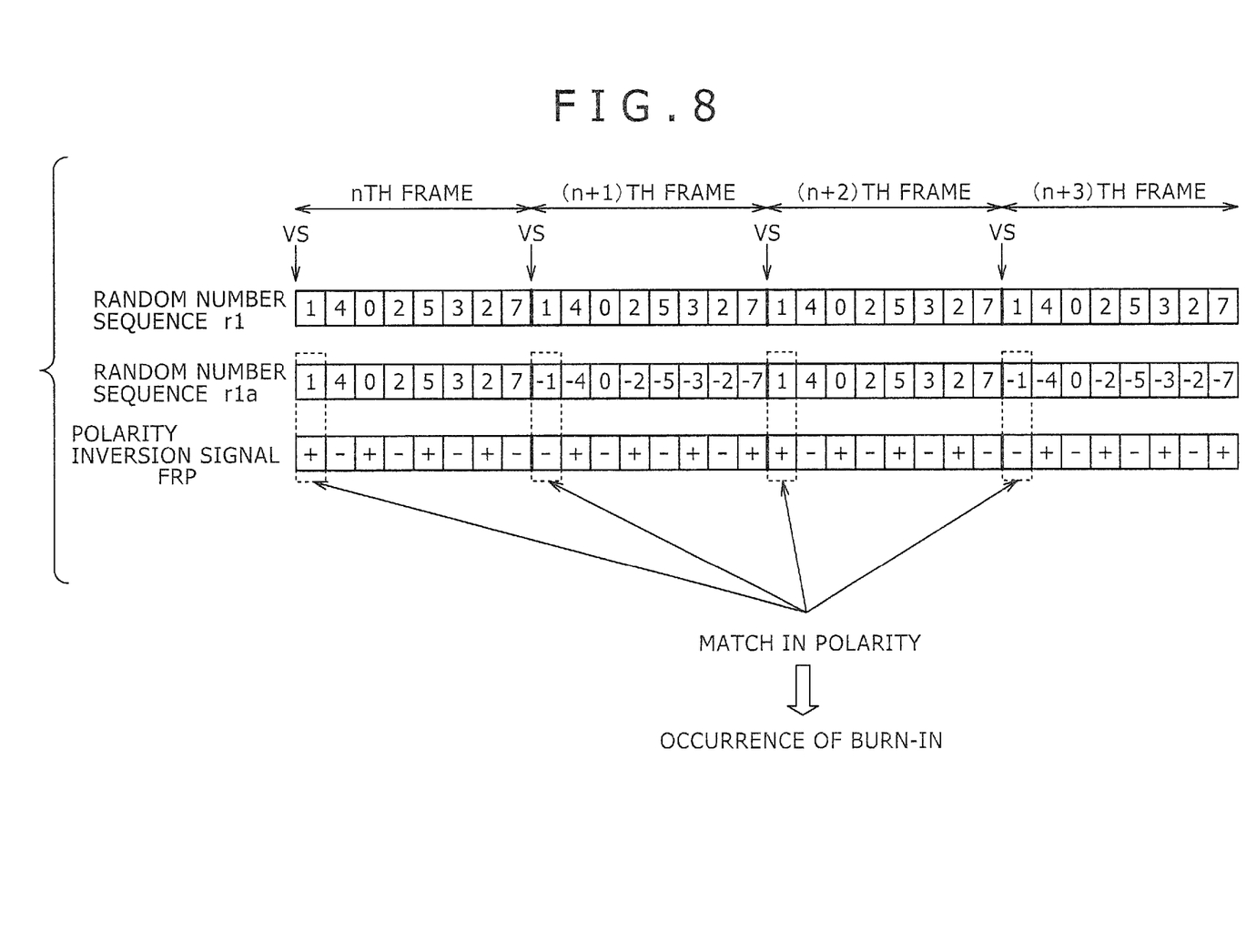
FIG. 8 is a diagram for describing the process adapted to minimize FPN.

A description will be given next of the process adapted to minimize FPN. FIG. 8 is a diagram for describing the process adapted to minimize FPN. The random number sequence to be superimposed has polarity for each pixel. As a countermeasure against FPN, however, the polarity of the random number sequence was inverted every frame.

A random number sequence r1 contains 1, 4, 0, 2, 5, 3, 2 and 7 per frame in FIG. 8. Further, the same sequence r1 having a pattern of numbers: 1, 4, 0, 2, 5, 3, 2 and 7 is output every frame each time the vertical synchronization signal vs is received (it should be noted that only the numbers in the first row of the random sequence number in FIG. 7 are shown).

A random number sequence r1$a$ is the same as the random number sequence r1 except that the polarity is inverted every frame. Therefore, the nth frame of the same sequence r1$a$ has a pattern of numbers: 1, 4, 0, 2, 5, 3, 2 and 7, and the (n+1)th frame thereof −1, −4, 0, −2, −5, −3, −2 and −7.

Further, the (n+2)th frame of the random number sequence r1$a$ has a pattern of numbers: 1, 4, 0, 2, 5, 3, 2 and 7, and the (n+3)th frame thereof −1, −4, 0, −2, −5, −3, −2 and −7.

As described above, the random number is averaged along the time axis by changing the polarity of the random number every frame without changing the absolute values thereof. This provides a random number component of plus or minus zero to be superimposed. As a result of this process, it has been found that FPN caused by a superimposed random number component is no longer visible.

Further, as a result of the process shown in FIG. 8, false contour, waving and flickering was similarly minimized to the extent of becoming invisible.

However, inverting the polarity of the random number every frame as illustrated in FIG. 8 causes the polarity of the first random number of a frame to match that of a polarity inversion signal FRP (frame reverse pulse) adapted to reverse the polarity of liquid crystal.

That is, in the case of FIG. 8, the polarity of the first random number of the nth frame is positive, and the polarity of the polarity inversion signal FRP is also positive. Further, the polarity of the first random number of the (n+1)th frame is negative, and the polarity of the same signal FRP is also negative.

Still further, the polarity of the first random number of the (n+2)th frame is positive, and the polarity of the polarity inversion signal FRP is also positive. Still further, the polarity of the first random number of the (n+3)th frame is negative, and the polarity of the same signal FRP is also negative.

As described above, the polarity of the first random number of each frame is the same as that of the polarity inversion signal FRP, thus resulting in the same polarity in odd and even frames. As a result, it was predicted that the liquid crystal screen may burn in.

Figure 9:
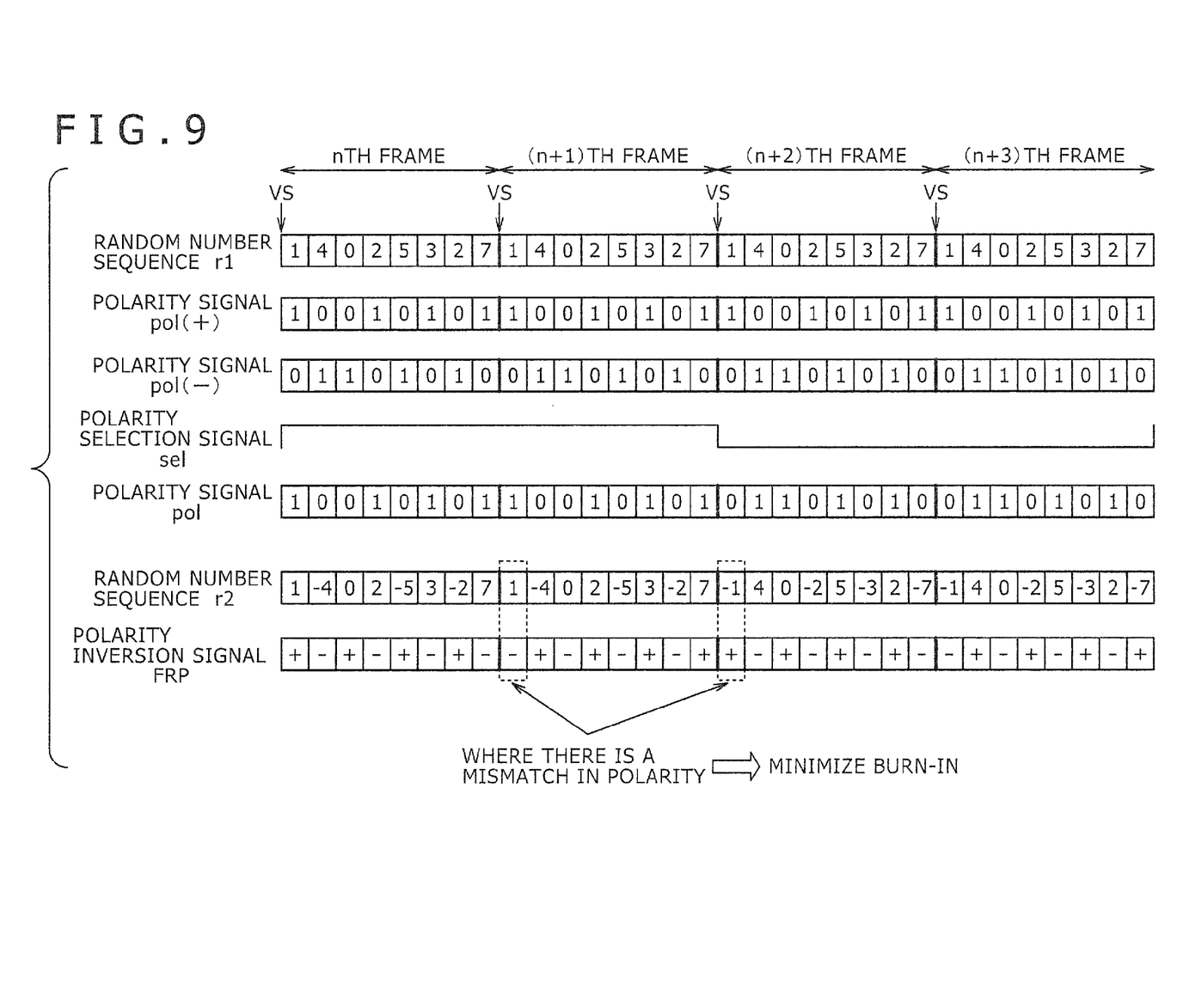

A description will be given next of the process adapted to minimize burn-in on the liquid crystal screen. FIG. 9 is a diagram for describing the process adapted to minimize screen burn-in. As a countermeasure against possible screen burn-in, the intervals at which to invert the polarity were changed to twice as long a period as for random number polarity inversion every frame shown in FIG. 8, i.e., once every two frames.

A description will be given below of the process performed in FIG. 9 with reference to the circuit configuration shown in FIG. 6. Each of the random number generators 11-1 to 11-*m* generates and outputs a random number. The random number sequence r1 contains 1, 4, 0, 2, 5, 3, 2 and 7 per frame in FIG. 9. As a result, a pattern of numbers: 1, 4, 0, 2, 5, 3, 2 and 7 is output every frame each time the vertical synchronization signal vs is received.

The polarity signal generation section 12 outputs the polarity signal pol(+). The polarity signal pol(+) contains 1, 0, 0, 1, 0, 1, 0 and 1 per frame in FIG. 9. As a result, a pattern of numbers: 1, 0, 0, 1, 0, 1, 0 and 1 is output every frame each time the vertical synchronization signal vs is received.

Further, the inverter 14 inverts the polarity signal pol(+) and outputs the polarity signal pol(−) having a pattern of numbers: 0, 1, 1, 0, 1, 0, 1 and 0.

The polarity selection instruction section 13 outputs the polarity selection signal sel so that the polarity signal pol(+) or polarity signal pol(−) is selected once every two frames.

For example, when the polarity signal pol(+) is selected, the polarity selection signal sel is pulled up to high level. On the other hand, when the polarity signal pol(−) is selected, the polarity selection signal sel is pulled down to low level.

The selector 15 selects, based on the polarity selection signal sel, either the polarity signal pol(+) or polarity signal pol(−) and outputs the selected signal. That is, when the polarity selection signal sel is high, the selector 15 selects and outputs the same signal pol(+). On the other hand, when the polarity selection signal sel is low, the selector 15 selects and outputs the same signal pol(−).

Therefore, the polarity signal pol output from the selector 15 contains 1, 0, 0, 1, 0, 1, 0 and 1 in the nth and (n+1)th frames. On the other hand, the same signal pol contains 0, 1, 1, 0, 1, 0, 1 and 0 in the (n+2)th and (n+3)th frames.

The random number sequence output section 16 generates a random number sequence r2 by adding the polarity signal pol to the random number sequence r1, thus outputting the generated random number sequence r2. The same sequence r2 is a random number sequence to be eventually superimposed on a stretch factor.

When the polarity signal pol is 1, the random number sequence r2 is positive. On the other hand, when the polarity signal pol is 0, the same sequence r2 is negative. Therefore, the random number sequence r2 contains 1, −4, 0, 2, −5, 3, −2 and 7 in the nth and (n+1)th frames. Further, the same sequence r2 contains −1, 4, 0, −2, 5, −3, 2 and −7 in the (n+2)th and (n+3)th frames. As described above, the polarity of the random number sequence is inverted once every two frames.

Here, we consider the polarity of the first random number of each frame and that of the polarity inversion signal FRP. The polarity of the first random number is positive in the (n+1)th frame, and that of the polarity inversion signal FRP is negative in the same frame. Further, the polarity of the first random number is negative in the (n+2)th frame, and that of the polarity inversion signal FRP is positive in the same frame.

In the stage of FIG. 8, the polarity of the first random number of each frame is the same as that of the polarity inversion signal FRP. However, the process shown in FIG. 9 provides occurrences of mismatch in polarity between the first random number of the frame and the polarity inversion signal FRP.

As a result of the process described above, no screen burn-in occurred, and no burn-in was detected during aging. It should be noted that false contour, waving, flickering and FPN were similarly all minimized to the extent of becoming invisible as a result of the process shown in FIG. 9.

A description will be given next of rounding of output bits of an image signal. The image output part 112 of the random number superimposition portion 110 shown in FIG. 4 multiplies data obtained by inverse gamma transform by a random number-superimposed stretch factor.

Here, we let the data obtained by inverse gamma transform be denoted by P, the stretch factor by $\alpha$, and the random number by N. It should be noted that we assume that P is 16 bits long, $\alpha$ 12 bits long, and N 4 bits long. Then, the multiplication formula is given by Equation (1). It should be noted that P×N in Equation (1) is the random number eventually superimposed on the image signal.

$$P \times (\alpha + N) = P \times \alpha + P \times N \quad (1)$$

Figure 10:
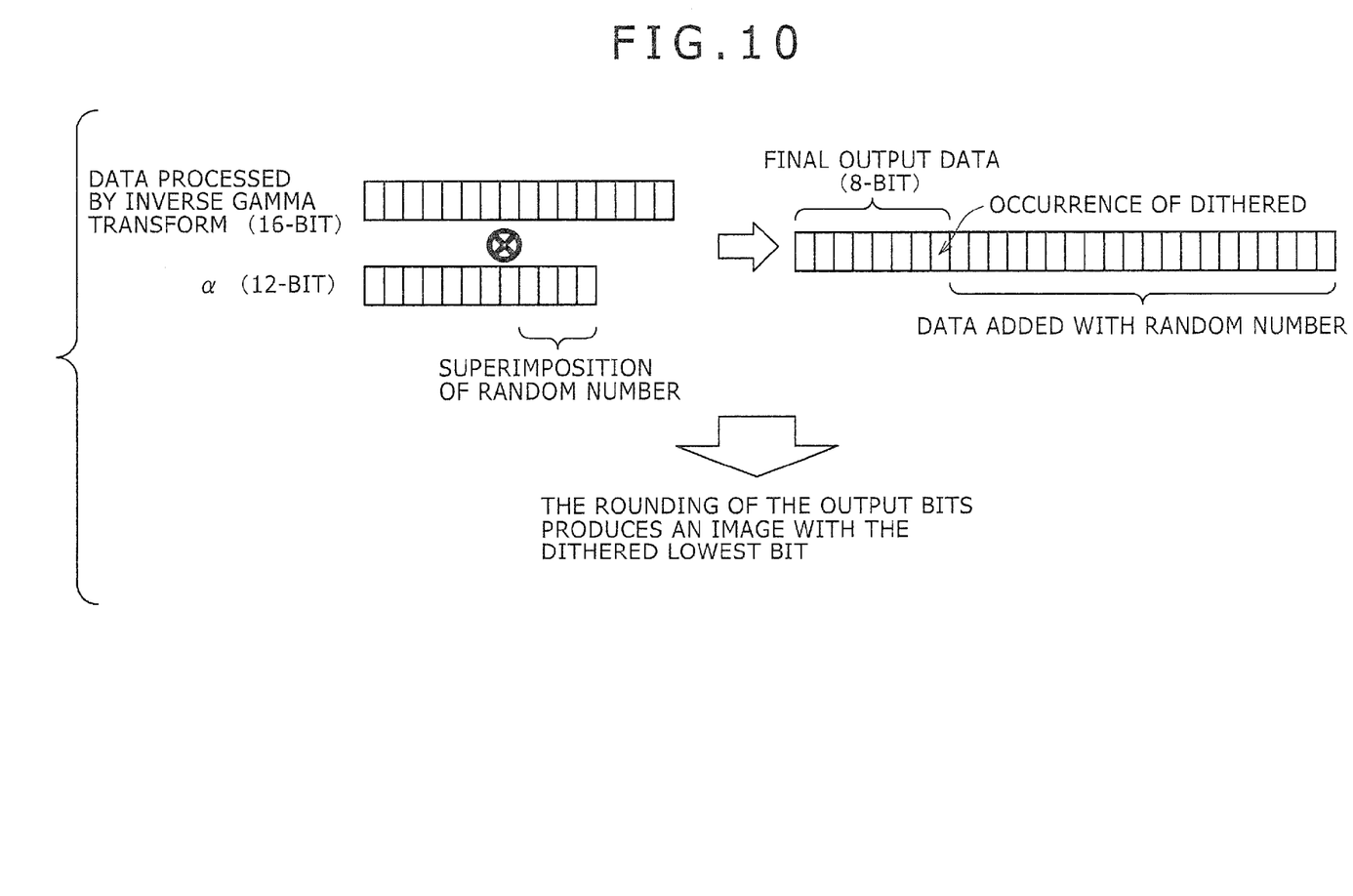
FIG. 10 is a diagram for describing rounding of output bits.

FIG. 10 is a diagram for describing rounding of output bits. FIG. 10 schematically illustrates the rounding described above. The 16-bit data obtained by inverse gamma transform is multiplied by the random number-superimposed stretch factor on which the 4-bit random number has been superimposed.

The multiplication result is 28-bit image data. The image output part 112 performs rounding adapted to round down bits 0 to 19, i.e., data added with the random number, and use the remaining 8 bits, namely bits 20 to 27 as the final image output data.

The lowest bit of this 8-bit image data is dithered. As a result, the 8-bit image data has changed into a smooth image with the dithered lowest bit.

As described above, the image processor 1 generates a random number-superimposed luminance variable by superimposing a random number sequence on a luminance variable and generates a random number-superimposed image signal by superimposing the random number-superimposed luminance variable on an image signal.

Dithering effect produced by superimposing a random number as described above renders invisible the boundaries between the 8-bit gray levels of the display, thus minimizing false contour and waving for improved image quality. Further, the random number sequence generation circuit 10 generates and outputs a random number sequence having the same set of numbers every frame, thus minimizing flickering.

Still further, the random number sequence generation circuit 10 inverts the polarity of the random number sequence once every two frames without changing the absolute values thereof, thus minimizing FPN and screen burn-in.

It should be noted that the present technology may have the following configurations.

(1) An image processor, including:
a random number sequence generation section adapted to generate a random number sequence;
a random number-superimposed luminance variable generation section adapted to generate a random number-superimposed luminance variable by superimposing the random number sequence on a luminance variable; and
a random number-superimposed image signal generation section adapted to generate a random number-superimposed image signal by superimposing the random number-superimposed luminance variable on an image signal.

(2) The image processor of feature (1), in which
the random number sequence generation section inverts the polarity of the random number sequence once every two frames without changing the absolute values thereof.

(3) The image processor of feature (1) or (2), in which
the random number sequence generation section generates and outputs a random number sequence having the same set of numbers every frame.

(4) The image processor of any one of features (1) to (3), in which
the random number-superimposed image signal generation section performs rounding adapted to round the random number-superimposed image signal to a predetermined number of bits and outputs the resultant signal.

(5) The image processor of any one of features (1) to (4), in which
the random number-superimposed image signal generation section rounds the random number-superimposed image signal and outputs an image with the dithered lowest bit.

(6) An image processing method, including:
generating a random number sequence;
generating a random number-superimposed luminance variable by superimposing the random number sequence on a luminance variable; and
generating a random number-superimposed image signal by superimposing the random number-superimposed luminance variable on an image signal.

(7) The image processing method of feature (6) including:
inverting the polarity of the random number sequence once every two frames without changing the absolute values thereof.

(8) The image processing method of feature (6) or (7) including:
generating and outputting a random number sequence having the same set of numbers every frame.

(9) The image processing method of any one of features (6) to (8) including:
performing rounding adapted to round the random number-superimposed image signal to a predetermined number of bits and outputting the resultant signal.

(10) The image processing method of any one of features (6) to (9) including:
rounding the random number-superimposed image signal and outputting an image with the dithered lowest bit.

It should be noted that the present embodiment can be modified in various ways without departing from the scope of the present embodiment.

Further, the above embodiment can be modified or changed in a number of ways by those skilled in the art and are not limited to the accurate configurations and application examples described above.

The present disclosure contains subject matter related to that disclosed in Japanese Priority Patent Application JP 2012-063752 filed in the Japan Patent Office on Mar. 21, 2012, the entire content of which is hereby incorporated by reference.

What is claimed is:

1. An image processor, comprising:
a random number sequence generation section adapted to generate a random number sequence;
a random number-superimposed luminance variable generation section adapted to generate a random number-superimposed luminance variable by superimposing the random number sequence on a luminance variable; and
a random number-superimposed image signal generation section adapted to generate a random number-superimposed image signal by superimposing the random number-superimposed luminance variable on an image signal,
wherein the random number sequence generation section inverts the polarity of the random number sequence once every two frames without changing the absolute values thereof.

2. An image processor of, comprising:
a random number sequence generation section adapted to generate a random number sequence;
a random number-superimposed luminance variable generation section adapted to generate a random number-superimposed luminance variable by superimposing the random number sequence on a luminance variable; and
a random number-superimposed image signal generation section adapted to generate a random number-superimposed image signal by superimposing the random number-superimposed luminance variable on an image signal,
wherein the random number-superimposed image signal generation section performs rounding adapted to round the random number-superimposed image signal to a predetermined number of bits and outputs the resultant signal.

3. The image processor of claim 2, wherein
the random number-superimposed image signal generation section rounds the random number-superimposed image signal and outputs an image with the dithered lowest bit.

4. A non-transitory computer-readable medium having thereon instructions which, when executed by a processing unit, causes the processing unit to perform operations comprising:
generating, by the processing unit, a random number sequence;
generating, by the processing unit, a random number-superimposed luminance variable by superimposing the random number sequence on a luminance variable;
generating, by the processing unit, a random number-superimposed image signal by superimposing the random number-superimposed luminance variable on an image signal; and
inverting, by the processing unit, the polarity of the random number sequence once every two frames without changing the absolute values thereof.

5. A non-transitory computer-readable medium having thereon instructions which, when executed by a processing unit, causes the processing unit to perform operations comprising:

generating, by the processing unit, a random number sequence;

generating, by the processing unit, a random number-superimposed luminance variable by superimposing the random number sequence on a luminance variable;

generating, by the processing unit, a random number-superimposed image signal by superimposing the random number-superimposed luminance variable on an image signal; and performing, by the processing unit, rounding adapted to round the random number-superimposed image signal to a predetermined number of bits and outputting the resultant signal.

6. The image processing method of claim 5 comprising:

rounding, by the processing unit, the random number-superimposed image signal and outputting an image with the dithered lowest bit.

7. The image processor of claim 2, wherein the random number sequence generation section generates and outputs a random number sequence having the same set of numbers every frame.

8. The non-transitory computer-readable medium of claim 5, the operations further comprising:

generating and outputting, by the processing unit, a random number sequence having the same set of numbers every frame.

* * * * *